United States Patent
Kim et al.

(10) Patent No.: US 10,992,186 B2
(45) Date of Patent: Apr. 27, 2021

(54) WIRELESS POWER TRANSMISSION DEVICE AND METHOD

(71) Applicant: LG ELECTRONICS INC., Seoul (KR)

(72) Inventors: Kyunghwan Kim, Seoul (KR); Jinho Youn, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/468,618

(22) PCT Filed: Aug. 3, 2017

(86) PCT No.: PCT/KR2017/008388
§ 371 (c)(1),
(2) Date: Jun. 11, 2019

(87) PCT Pub. No.: WO2018/110790
PCT Pub. Date: Jun. 21, 2018

(65) Prior Publication Data
US 2020/0091774 A1    Mar. 19, 2020

(30) Foreign Application Priority Data
Dec. 12, 2016   (KR) .................. 10-2016-0168589

(51) Int. Cl.
*H02J 50/30* (2016.01)
*H02J 50/80* (2016.01)
(Continued)

(52) U.S. Cl.
CPC ............ *H02J 50/30* (2016.02); *G02B 3/0037* (2013.01); *H02J 7/025* (2013.01); *H02J 50/80* (2016.02); *G02B 2003/0093* (2013.01)

(58) Field of Classification Search
CPC .. H02J 50/30; H02J 50/90; H04B 10/806–808
See application file for complete search history.

(56) References Cited

U.S. PATENT DOCUMENTS 6,407,535 B1 *   6/2002   Friedman ............... B64D 41/00
                                                   244/1 R
6,534,705 B2 *   3/2003   Berrios .................... H02J 7/35
                                                   136/243
(Continued)

FOREIGN PATENT DOCUMENTS

KR   1020120009929    2/2012
KR   1020120068581    6/2012
(Continued)

OTHER PUBLICATIONS

PCT International Application No. PCT/KR2017/008388, Written Opinion of the International Searching Authority dated Nov. 9, 2017, 18 pages.

*Primary Examiner* — Thomas J. Hiltunen
(74) *Attorney, Agent, or Firm* — Lee, Hong, Degerman, Kang & Waimey

(57) ABSTRACT

The present specification discloses a wireless power transmission device and method thereof. Here, the wireless power transmission device according to an embodiment of the present invention includes: a laser light source unit; a light output unit which emits laser light generated from the laser light source to a light receiving unit of the wireless power receiving device; and a control unit which controls shaping of the emitted light according to the angle of arrival with the light receiving unit so that an overfill loss is less than a predetermined threshold value. Here, the control unit detects the point at which the power conversion efficiency of the light receiving unit is highest, and sets and controls the power density value of the emitted light at the detected point.

9 Claims, 14 Drawing Sheets

(51) Int. Cl.
  *G02B 3/00* (2006.01)
  *H02J 7/02* (2016.01)

(56) References Cited

U.S. PATENT DOCUMENTS

| | | | |
|---|---|---|---|
| 8,264,101 B2* | 9/2012 | Hyde | H02J 50/30 307/80 |
| 8,686,331 B2* | 4/2014 | Armstrong | G01J 9/00 250/201.9 |
| 9,893,535 B2* | 2/2018 | Leabman | H02J 7/025 |
| 9,912,195 B2* | 3/2018 | Homma | H02J 50/23 |
| 9,941,748 B2* | 4/2018 | Lucrecio | H02J 50/30 |
| 9,985,157 B2* | 5/2018 | Giesen | H01L 31/0547 |
| 10,488,549 B2* | 11/2019 | Kare | G01S 7/484 |
| 2006/0178142 A1* | 8/2006 | Lovberg | H04B 1/38 455/431 |
| 2006/0266917 A1* | 11/2006 | Baldis | H01Q 1/248 250/200 |
| 2010/0320362 A1 | 12/2010 | Alpert et al. | |
| 2019/0064353 A1* | 2/2019 | Nugent, Jr. | G01S 17/003 |

FOREIGN PATENT DOCUMENTS

| | | |
|---|---|---|
| KR | 101464733 | 11/2014 |
| KR | 1020150090964 | 8/2015 |

* cited by examiner

Cross-section of received light
$\theta_2 > \theta_1 > 0°$ (a)

(b)

(c)

(a)

(b)

(a)

(b)

(c)

(a)

(b)

WIRELESS POWER TRANSMISSION DEVICE AND METHOD

CROSS-REFERENCE TO RELATED APPLICATIONS

This application is the National Stage filing under 35 U.S.C. 371 of International Application No. PCT/KR2017/008388, filed on Aug. 3, 2017, which claims the benefit of earlier filing date and right of priority to Korean Application No. 10-2016-0168589, filed on Dec. 12, 2016, the contents of which are all hereby incorporated by reference herein in their entirety.

TECHNICAL FIELD

The present disclosure relates to a wireless power transmission apparatus and method thereof.

BACKGROUND ART

In recent years, wireless power transmission technology (technique) has been widely deployed. For example, the wireless power transmission technology has been researched and developed not only for wireless charging of a smartphone, an electric vehicle, etc. but also for application fields such as provision of power to a wearable device, a sensor for Internet of Things (IoT), etc.

The wireless power transmission technology is technology for transferring energy with no electrical wire by converting electrical energy into electromagnetic waves. In particular, for wireless transmission, electrical energy is converted into high-frequency electrical signals or light waves with specific frequencies, and then such electromagnetic waves are transmitted for energy transfer.

The wireless power transmission technology is divided into short-range wireless power transmission technology and long-range wireless power transmission technology. The short-range wireless power transmission technology is subdivided into a magnetic induction based method, where transmission is performed such that an induced current is generated by a nearby coil, and a magnetic resonance based method, where transmission is performed by matching the resonance frequencies of transmitting and receiving sides. The long-range wireless power transmission technology is subdivided into a microwave-based method, where power is converted into microwaves for transmission thereof, and a laser-based method, where power is converted into lasers for transmission thereof.

As described above, the short-range wireless power transmission technology has been developed enough to be applied to the wireless smartphone charging. In addition, relevant standards have been discussed. On the other hand, the long-range wireless power transmission technology has been researched for an unmanned aerial vehicle with a special purpose such as a military drone, but the maturity of the technology has not been fully reached.

Meanwhile, wireless power transmission may have a problem of performance degradation due to a mismatch in alignment between transmitting and receiving sides. Although this problem can be solved by adjusting the alignment between the transmitting and receiving sides, it is difficult to realistically match the alignment between the transmitting and receiving sides, and thus the problem that the efficiency of the wireless power transmission is degraded still exists.

DISCLOSURE

Technical Problem

To solve the above-described problem, the present disclosure proposes a wireless power transmission apparatus and method thereof.

An object of the present disclosure is to improve wireless power transmission efficiency based on an effective light receiving area of a wireless power receiving side.

Another object of the present disclosure is to provide a wireless power transmission method adaptive to a change in the effective light receiving area of the wireless power receiving side.

A further object of the present disclosure is to reduce wireless charging time and increase the overall efficiency of a wireless power system by improving the wireless power transmission efficiency.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure proposes a wireless power transmission apparatus and method thereof.

In an aspect of the present disclosure, provided is a wireless power transmission apparatus. The wireless power transmission apparatus may include: a laser light source unit; a light output unit configured to emit laser light generated by the laser light source unit to a light receiving unit of a wireless power reception apparatus; and a control unit configured to control shaping of the emitted light based on an angle of arrival at the light receiving unit such that overfill loss becomes smaller than a predetermined threshold. The control unit may be configured to detect a point at which power conversion efficiency of the light receiving unit is maximized and configure and control a power density value of the emitted light at the detected point.

It will be appreciated by persons skilled in the art that the solutions that can be achieved through the present disclosure are not limited to what has been particularly described hereinabove and other solutions of the present disclosure will be more clearly understood from the following detailed description.

Advantageous Effects

The present disclosure has the following advantageous effects.

According to at least one embodiment of the present disclosure, wireless power transmission efficiency can be improved based on an effective light receiving area of a wireless power receiving side.

According to at least one embodiment of the present disclosure, it is possible to prevent the wireless power transmission efficiency from being degraded by changing a transmission mechanism adaptive to a change in the effective light receiving area of the wireless power receiving side.

According to at least one embodiment of the present disclosure, it is possible to prevent the efficiency of a wireless power system from being degraded and/or improve the efficiency of the wireless power system even though there are various events during a wireless power transmission process.

It will be appreciated by persons skilled in the art that the effects that can be achieved through the present invention are not limited to what has been particularly described hereinabove and other advantages of the present invention will be more clearly understood from the following detailed description.

BEST MODE FOR INVENTION

Figure 1:
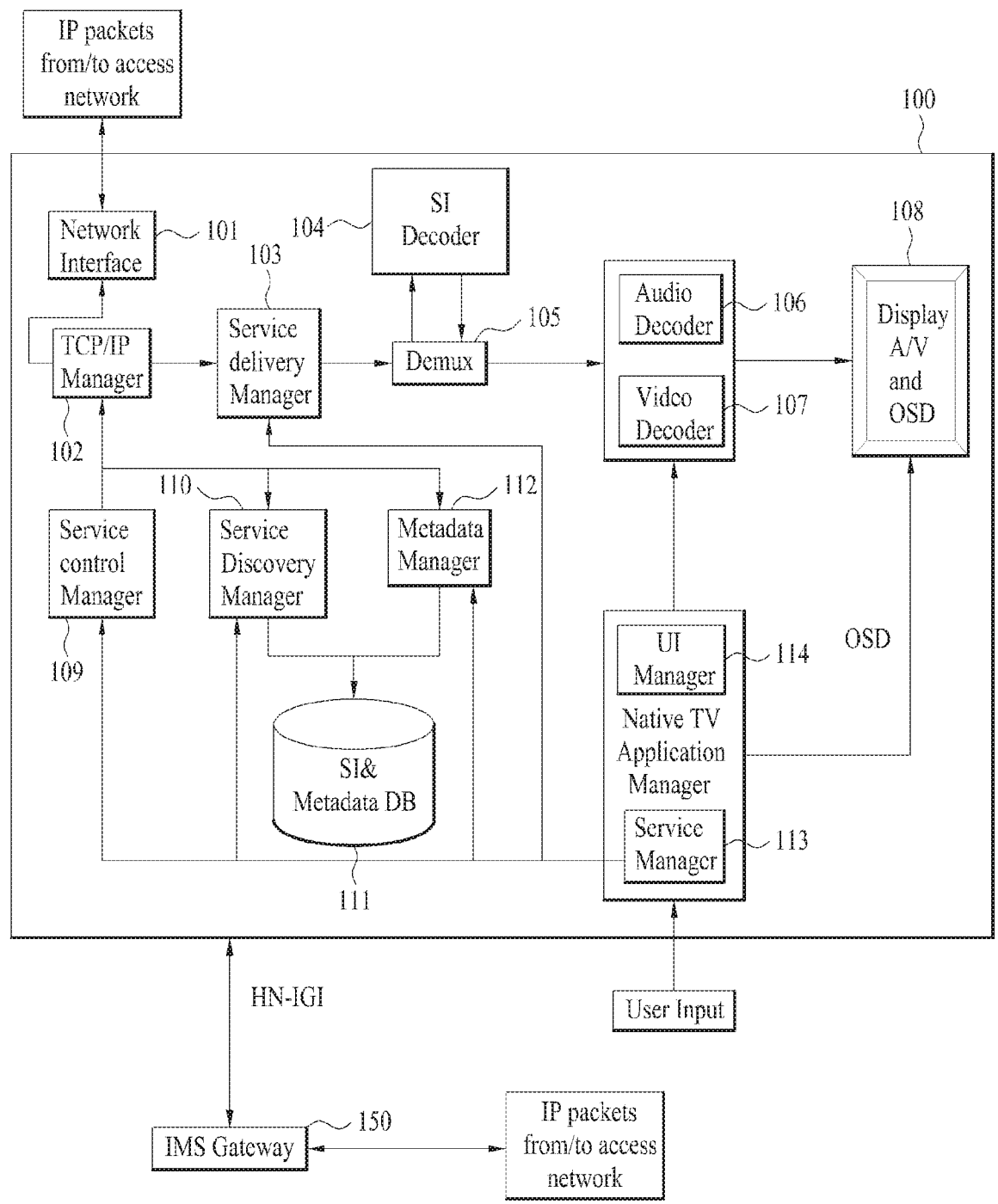
FIG. 1 is a diagram illustrating an embodiment of a wireless power reception apparatus according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following, a wireless power transmission apparatus and method thereof according to the present disclosure will be described in detail with reference to the attached drawings.

Wireless power transmission technology can be divided into: short-range wireless power transmission technology based on magnetic induction and magnetic resonance; and long-range wireless power transmission technology based on microwaves and lasers in terms of distance. In addition, the wireless power transmission technology can be divided into contact-based wireless power transmission technology and non-contact-based wireless power transmission technology, depending on whether there is contact. The present disclosure will be described mainly based on the long-range and/or non-contact-based wireless power transmission technology for convenience and clarity of description. Although the scope of the long-range wireless power transmission technology may partially or completely overlap with that of the non-contact-based wireless power transmission technology, they may mean different technologies. The present disclosure is not limited to the long-range and/or non-contact-based wireless power transmission technology, that is, the disclosure is applicable to the short-range and/or contact-based wireless power transmission technology. Although the present disclosure is described based on the non-contact-based wireless power transmission technology for convenience of description, the disclosure is not limited thereto.

Although the non-contact-based wireless power transmission technology according to the present disclosure is described based on laser mode regardless of distance for convenience of description, the disclosure is not limited thereto. The laser mode uses a laser as a light source. However, a light source according to the present disclosure is not limited to a laser, and all light sources including a Light Emitting Diode (LED) capable of generating a photon using electricity, a lamp, etc. may replace the laser.

Meanwhile, when a laser is used as a light source, a near-infrared ray or Infrared Ray (IR) region is used since an Ultra Violet (UV) region is mostly absorbed in air and a visible ray region has visual issues.

In other words, various embodiments of the present disclosure are described based on wireless power transmission using laser light. In particular, the present specification describes the wireless power transmission apparatus and method thereof based on the various embodiments of the present disclosure, and more particularly, based on each of the embodiments or any combination thereof. That is, the present disclosure describes how to prevent degradation in wireless power transmission efficiency and/or improve the wireless power transmission efficiency using a transmission mechanism adaptive to an effective light receiving area of a wireless power receiving side or a change in the effective light receiving area.

The present specification mainly describes the wireless power transmission apparatus. Meanwhile, as a counterpart of the wireless power transmission apparatus, a wireless power reception apparatus may include all kinds of devices that require power charging for operation thereof such as a television (TV), an appliance, a smartphone, a mobile device including a wearable device, a lighting device, an electric vehicle, an electric razor, a (small) photovoltaic power generator, etc. However, for clarity, the present specification describes such a wireless power reception apparatus if necessary.

Figure 2:
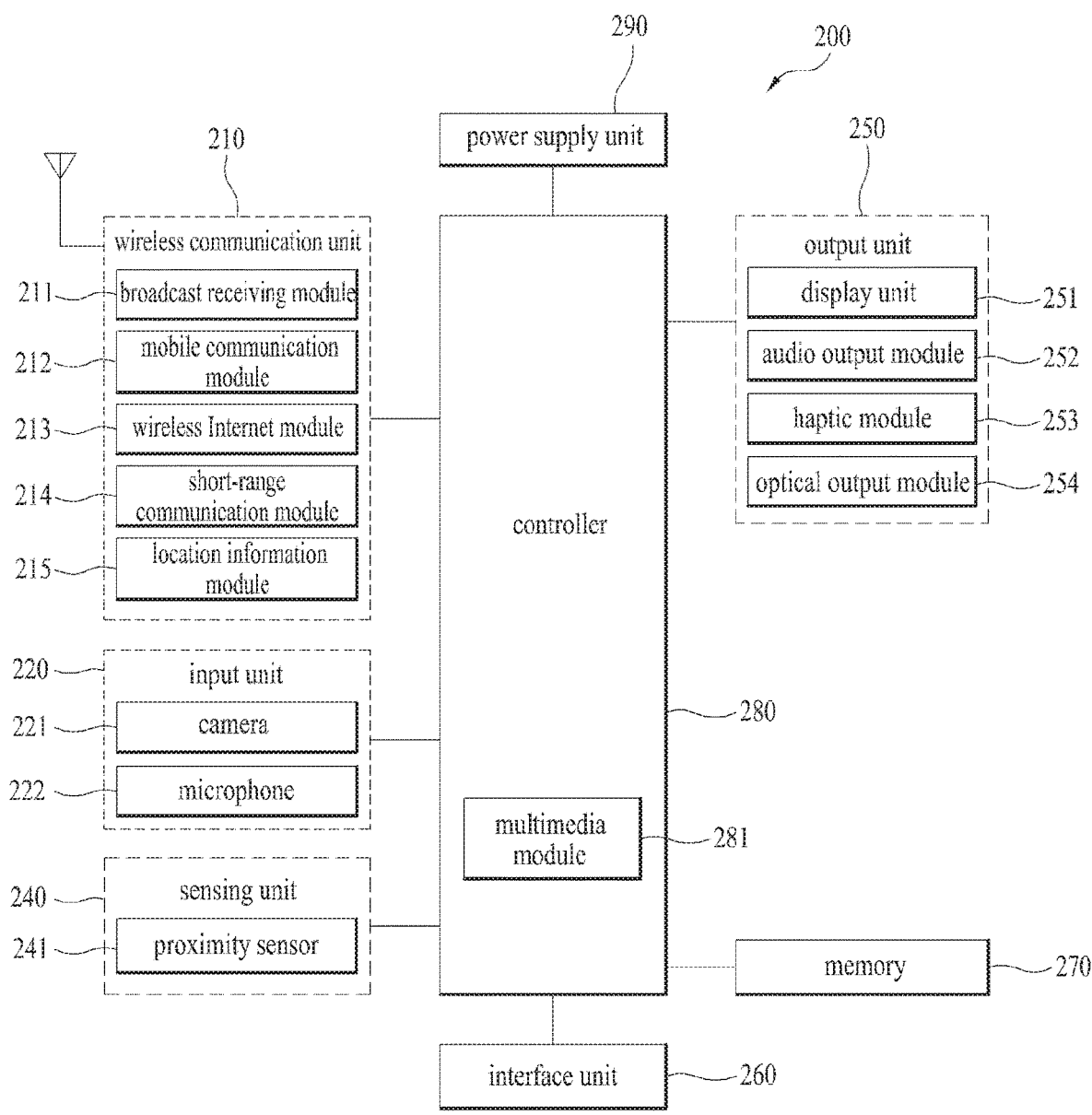
FIG. 2 is a diagram illustrating another embodiment of the wireless power reception apparatus according to the present disclosure.

FIGS. 1 and 2 illustrate the configurations of a TV and a mobile terminal as an example of the above-described wireless power reception apparatus. In the following, the TV and mobile terminal will be described in brief. It should be noted that the wireless power reception apparatus is not limited to the TV of FIG. 1 or the mobile terminal of FIG. 2.

FIG. 1 is a block diagram illustrating the configuration of a wireless power reception apparatus according to an embodiment of the present disclosure.

As described above, FIG. 1 shows a digital TV as an example of the wireless power reception apparatus.

'Digital TV' described in the present specification includes any device capable of performing at least one of transmission, reception, processing and output of contents for example. Here, the data includes, for example, all data related to content, services, and applications. The digital TV may transmit/receive data including the content to/from the server or the like through a wire/wireless network. If necessary, the data can be converted before transmission/reception. Examples of such TVs include Network TV, Hybrid Broadcast Broadband TV (HBBTV), Smart TV, and IPTV (Internet Protocol TV). 'Digital TV' described in the present specification may have include a signage having a display panel only or a SET type with another configuration such as a set-top box (STB) and the like.

Referring to FIG. 1, the digital TV 100 may include a network interface 101, a TCP/IP manager 102, a service delivery manager 103, an SI decoder 104, a demuxer or demultiplexer 105, an audio decoder 106, a video decoder 107, a display A/V and OSD (On Screen Display) module 108, a service control manager 109, a service discovery manager 110, a SI & metadata database (DB) 111, a metadata manager 112, a service manager 113, a UI manager 114, etc.

The network interface 101 may transmit/receive IP (internet protocol) packet(s) or IP datagram(s) (hereinafter named IP pack(s)) to/from the server 105 through a network. The IP packet (s) include data relating to services, applications, content, and so on. The network interface unit 101 may be a tuner for receiving a broadcast signal received through an RF (Radio Frequency), or may be a component including the tuner.

The TCP/IP manager 102 may involve delivery of IP packets transmitted to the digital TV 100 and IP packets transmitted from the digital TV 100, that is, packet delivery between a source and a destination. The TCP/IP manager 102 may classify received packet(s) according to an appropriate protocol and output the classified packet(s) to the service delivery manager 105, the service discovery manager 110, the service control manager 109, the metadata manager 112, and the like.

The service delivery manager 103 may be in charge of controlling the received service data. The service delivery manager 103 may control real-time streaming data, for example, using RTP/RTCP. In case of transmitting the real-time streaming data using RTP, the service delivery manager 103 may parse the received data packet according to the RTP and then transmits the parsed data packet to the demultiplexer 105 or save the parsed data packet to the SI & metadata DB 111 under the control of the service manager 113. The service delivery manager 103 may feed back the network reception information to the service providing server side using RTCP.

The demultiplexer 105 may demultiplex a received packet into audio data, video data, SI (System Information/Service Information/Signaling Information) data and the like and then transmit the demultiplexed data to the audio/video decoder 106/107 and the SI decoder 104, respectively.

The SI decoder 104 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 104 may save the decoded service informations to the SI & metadata DB 111. The saved service information can be used by being read by a corresponding component in response to a user's request for example.

The audio decoder 106 and the video decoder 107 may decode the demultiplexed audio data and the demultiplexed video data, respectively. The decoded audio and video data may be provided to the user through the display unit 108.

The application manager includes a service manager 113 and a user interface (UI) manager 114 and is able to perform a function of a controller of the digital TV 100. So to speak, the application manager can administrate the overall states of the digital TV 100, provide a user interface (UI), and manage other mangers.

The UI manager 114 provides a graphical user interface/ user interface (GUI/UI) using OSD (on screen display) and the like. The UI manager 114 receives a key input from a user and then performs a device operation according to the input. For instance, if receiving a key input about a channel selection from a user, the UI manager 114 transmits the key input signal to the service manager 113.

The service manager 113 may control and manage service-related managers such as the service delivery manager 103, the service discovery manager 110, the service control manager 109, and the metadata manager 112.

The service manager 113 creates a channel map and controls a selection of a channel and the like using the created channel map in response to a key input received from the UI manager 114. The service manager 113 may receive service information from the SI decoder 104 and then sets an audio/video PID of a selected channel for the demultiplexer 105. Such a PID can be used for the demultiplexing procedure. Therefore, the demultiplexer 105 performs filtering (PID or section filtering) on audio data, video data and SI data using the PID.

The service discovery manager 110 may provide information required to select a service provider that provides a service. Upon receipt of a signal for selecting a channel from the service manager 113, the service discovery manager 110 searches for a service using the information.

The service control manager 109 may select and control a service. For example, the service control manager 109 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 109 may initialize and manage a session through the IMS gateway 250 using IMS (IP multimedia subsystem) and SIP (session initiation protocol). The protocols are exemplary, and other protocols are usable according to implementations.

The metadata manager 112 may manage metadata associated with services and save the metadata to the SI & metadata DB 111.

The SI & metadata DB 111 may store service information decoded by the SI decoder 104, metadata managed by the metadata manager 112, and information required to select a service provider, which is provided by the service discovery manager 110. In addition, the SI & metadata DB 111 can store system set-up data and the like for the system. The SI & metadata database 111 may be implemented with non-volatile RAM (NVRAM), flash memory and the like.

Meanwhile, an IMS gateway 250 is a gateway in which functions required for an access to an IMS based IPTV service are collected.

A power supply unit 160 is configured to provide power to the above-described digital TV components. The power supply unit 160 includes a wired interface required to provide power to the digital TV. In addition, the power supply unit 160 includes a wireless power light-receiving interface (not shown in the drawing) required to receive wireless power transmitted from the wireless power transmission apparatus according to the present disclosure. The wireless power light-receiving interface may be disposed on either the front or rear surface of the digital TV or implemented as a separate device outside the digital TV in order to provide power to the digital TV through a wired or wireless connector.

Referring to FIG. 2, a mobile terminal 200 is described as another example of the wireless power reception apparatus.

A mobile terminal is extended from a smartphone for generating and consuming communication content to a device for performing a variety of functions by interworking with various things. Such a mobile terminal may include a wearable device, that is, a device that a user can wear. For example, the wearable device may include not only devices such as a smart watch, smart glasses, a Head Mounted Display (HMD), an Eye Mounted Display (EMD), a Virtual Reality (VR) device, etc. and wearable products such as clothes, shoes, etc.

FIG. 2 is a block diagram illustrating the configuration of a wireless power reception apparatus according to another embodiment of the present disclosure.

Hereinafter, the mobile terminal will be described with reference to FIG. 2.

The mobile terminal 200 is shown having components such as a wireless communication unit 210, an input unit 220, a sensing unit 240, an output unit 250, an interface unit 260, a memory 270, a controller 280, and a power supply unit 290. It is understood that implementing all of the illustrated components in The FIG. 2A is not a requirement, and that greater or fewer components may alternatively be implemented.

More specifically, the wireless communication unit 210 typically includes one or more modules which permit communications such as wireless communications between the mobile terminal 200 and a wireless communication system, communications between the mobile terminal 200 and another mobile terminal, communications between the mobile terminal 200 and an external server. Further, the wireless communication unit 210 typically includes one or more modules which connect the mobile terminal 200 to one or more networks.

To facilitate such communications, the wireless communication unit 210 includes one or more of a broadcast receiving module 211, a mobile communication module 212, a wireless Internet module 213, a short-range communication module 214, and a location information module 215.

The input unit 220 includes a camera 221 for obtaining images or video, a microphone 222, which is one type of audio input device for inputting an audio signal, and a user input unit 223 (for example, a touch key, a push key, a mechanical key, a soft key, and the like) for allowing a user to input information. Data (for example, audio, video, image, and the like) is obtained by the input unit 220 and may be analyzed and processed by controller 280 according to device parameters, user commands, and combinations thereof.

The sensing unit 240 is typically implemented using one or more sensors configured to sense internal information of the mobile terminal, the surrounding environment of the mobile terminal, user information, and the like. For example, the sensing unit 240 may alternatively or additionally include other types of sensors or devices, such as a proximity sensor 241 and an illumination sensor 242, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 200 may be configured to utilize information obtained from sensing unit 240, and in particular, information obtained from one or more sensors of the sensing unit 240, and combinations thereof.

The output unit 250 is typically configured to output various types of information, such as audio, video, tactile output, and the like. The output unit 250 is shown having a display unit 251, an audio output module 252, a haptic module 253, and an optical output module 254. The display unit 251 may have an inter-layered structure or an integrated structure with a touch sensor in order to facilitate a touch screen. The touch screen may provide an output interface between the mobile terminal 200 and a user, as well as function as the user input unit 223 which provides an input interface between the mobile terminal 200 and the user.

The interface unit 260 serves as an interface with various types of external devices that can be coupled to the mobile terminal 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 200 may perform assorted control functions associated with a connected external device, in response to the external device being connected to the interface unit 260.

The memory 270 is typically implemented to store data to support various functions or features of the mobile terminal 200. For instance, the memory 270 may be configured to store application programs executed in the mobile terminal 200, data or instructions for operations of the mobile terminal 200, and the like. Some of these application programs may be downloaded from an external server via wireless communication. Other application programs may be installed within the mobile terminal 200 at time of manufacturing or shipping, which is typically the case for basic functions of the mobile terminal 200 (for example, receiving a call, placing a call, receiving a message, sending a message, and the like). It is common for application programs to be stored in the memory 270, installed in the mobile terminal 200, and executed by the controller 280 to perform an operation (or function) for the mobile terminal 200.

The controller 280 typically functions to control overall operation of the mobile terminal 200, in addition to the operations associated with the application programs. The controller 280 may provide or process information or functions appropriate for a user by processing signals, data, information and the like, which are input or output, or activating application programs stored in the memory 270.

To drive the application programs stored in the memory 270, the controller 280 may be implemented to control a predetermined number of the components mentioned above in reference with FIG. 2A. Moreover, the controller 280 may be implemented to combinedly operate two or more of the components provided in the mobile terminal 200 to drive the application programs.

The power supply unit 290 can be configured to receive external power or provide internal power in order to supply appropriate power required for operating elements and components included in the mobile terminal 200. The power supply unit 290 may include a battery, and the battery may be configured to be embedded in the terminal body, or configured to be detachable from the terminal body. Meanwhile, similar to the power supply unit 160 of the digital TV, a power supply unit 290 of the mobile terminal also includes a wireless power light-receiving interface (not shown in the drawing) required to receive wireless power transmitted from the wireless power transmission apparatus according to the present disclosure. The wireless power light-receiving interface may be disposed on either the front or rear surface of the mobile terminal or implemented as a separate device (e.g., a charger) outside the mobile terminal in order to provide power to the mobile terminal through a wired or wireless connector.

Hereinafter, the wireless power transmission apparatus and method thereof will be described in detail with reference to the attached drawings.

Figure 3:
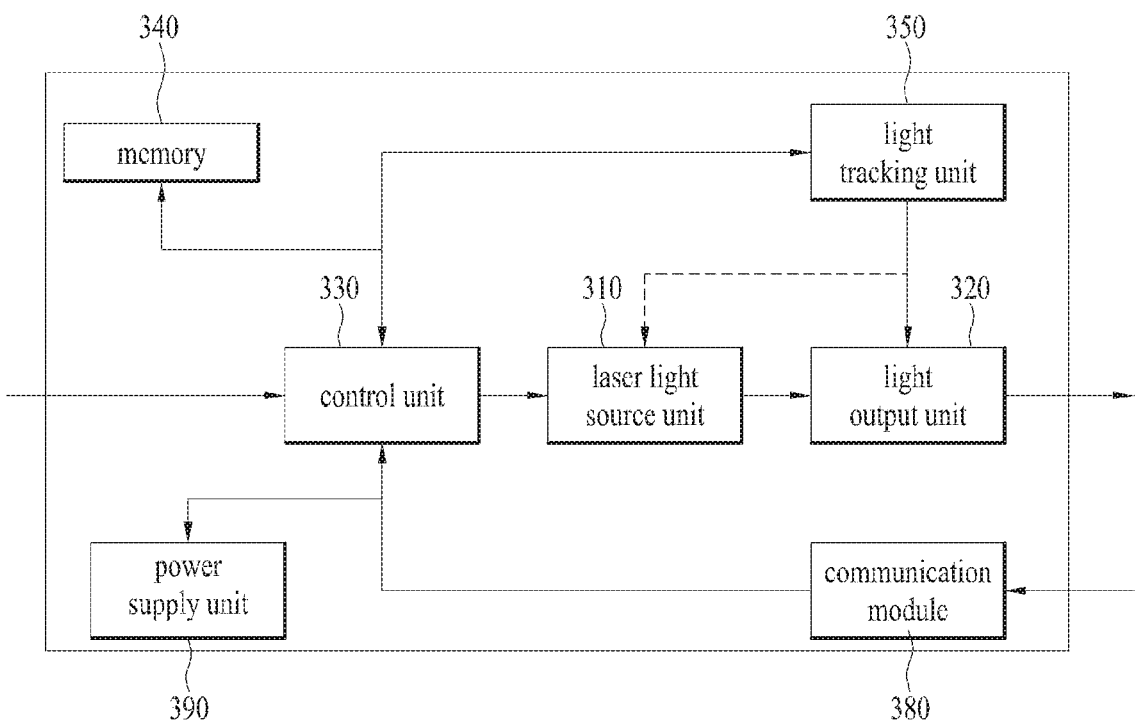
FIG. 3 is a block diagram illustrating the configuration of a wireless power transmission apparatus according to an embodiment of the present disclosure.

FIG. 3 is a block diagram illustrating the configuration of a wireless power transmission apparatus according to an embodiment of the present disclosure.

The wireless power transmission apparatus may include a laser light source unit, a light output unit configured to emit laser light generated by the laser light source unit to a light receiving unit of a wireless power reception apparatus, and a control unit configured to control shaping of the emitted light based on an AOA at the light receiving unit such that overfill loss becomes smaller than a predetermined threshold. The control unit may be configured to detect a point at which power conversion efficiency of the light receiving unit is maximized and configure and control a power density value of the emitted light at the detected point.

The control unit may be configured to extract the value of $P_{rep}$ from data received from the wireless power reception apparatus, determine whether the extracted value of $P_{rep}$ is smaller than a value obtained by subtracting $\Delta P$ from $P_{rep'}$, ($P_{rep} < P_{rep'} - \Delta P$), and control the shaping for at least one axis of the cross-sectional area of the emitted light based on the determination result. Here, $P_{rep}$ indicates the value of received power ($P_{out}$) reported by the wireless power reception apparatus to the wireless power transmission apparatus, $P_{rep'}$ indicates the initial value of $P_{rep}$, and $\Delta P$ indicates the minimum variation of the received power at which the shaping is required. When the value of $\Delta P_{rep}$ is smaller than a predetermined threshold, the control unit may be configured to terminate the shaping for the at least one axis of the cross-sectional area of the emitted light. Here, $\Delta P_{rep}$ indicates the minimum variation of $P_{rep}$ at which the shaping is required.

The control unit may be configured to determine whether the value of $\Delta P_{rep}$ is smaller than the predetermined threshold by adding $i\Delta P_t$ to $P_t$ and determine power density for optimized power of the emitted light based on the determination result. Here, $\Delta P_t$ indicates the power variation resolution of the emitted light and $\Delta P_{rep}$ indicates the minimum variation of $P_{rep}$ at which the shaping is required. In addition, the control unit may be configured to determine whether the value of $P_{rep}$ is equal to or greater than the value of $P_{req}$ and control whether to perform light radiation based on the determination result. Here, $P_{req}$ indicates the minimum required power of the wireless power reception apparatus.

Further, the wireless power transmission apparatus may further include a Motorized Focal Lens (MFL) module including a first lens and a second lens, each of which shapes each axis of the cross-sectional area of the emitted light and a communication module configured to receive data related to a light receiving area of the light receiving unit from the wireless power reception apparatus. In this case, at least one of the first and second lenses may be implemented as a cylindrical lens, and the MFL module may be configured to modify the cross-sectional area of the emitted light by adjusting a focal length of the emitted light based on a change in the AOA.

Referring to FIG. 3, the wireless power transmission apparatus may include a laser light source unit 310, a light output unit 320, a control unit 330, and a light tracking unit 350. The wireless power transmission apparatus may further include at least one of a memory 340, a communication module 380, and a power supply unit 390. Although not shown in the drawing, if necessary, some components may be removed or added for the wireless power transmission according to the present disclosure, or the individual components may be modularized. For example, the light tracking unit 350 may be implemented as a part of the control unit 330.

The laser light source unit 310 is configured to generate IR laser light for wireless power transmission. The generated laser light passes through the light output unit 320 and is then emitted to the light receiving unit of the wireless power reception apparatus. This process may be controlled by the control unit 330.

The control unit 330 is configured to control the overall operation of the wireless power transmission apparatus. In particular, the control unit 330 is configured to control a wireless power transmission process in the laser light source unit 310, and more particularly, the control unit 330 is configured to control a component(s) of the wireless power transmission apparatus based on the effective light receiving area of the light receiving unit of the wireless power reception apparatus according to the present disclosure. Details will be described later.

The memory 340 is configured to store various data required for the wireless power transmission process. In addition, the memory 340 may be configured to temporarily store data received through the communication module 380, which will be described later, and forward the data to the control unit 330.

The power supply unit 390 is configured to provide power to each component of the wireless power transmission apparatus.

The communication module 380 is configured to perform data communication with, for example, a wireless power transmission apparatus, an external server, an input means, etc. through wired or wireless communication. In particular, the communication module 380 may be configured to receive data fed back by the wireless power reception apparatus according to the present disclosure and forward the received data to at least one of the memory 340, control unit 330, and light tracking unit 350. Details will be described later.

The light tracking unit 350 is configured to perform beam tracking for wireless power transmission. Although FIG. 3 illustrates the light tracking unit 350 as one component of the wireless power transmission apparatus, the light tracking unit 350 may be implemented independently from the wireless power transmission apparatus.

Figure 7:
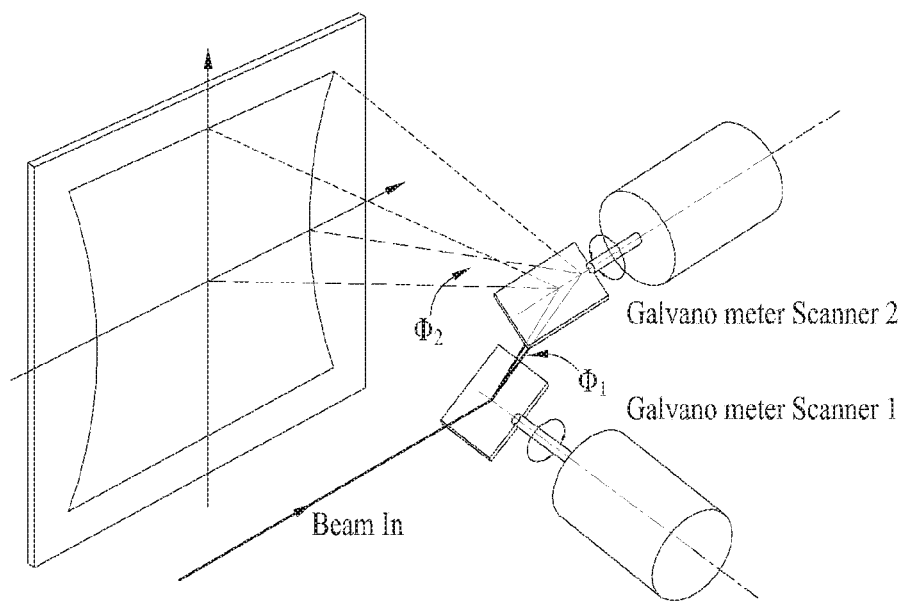
FIGS. 7 and 8 are diagrams illustrating beam tracking techniques related to the present disclosure.
Figure 7:
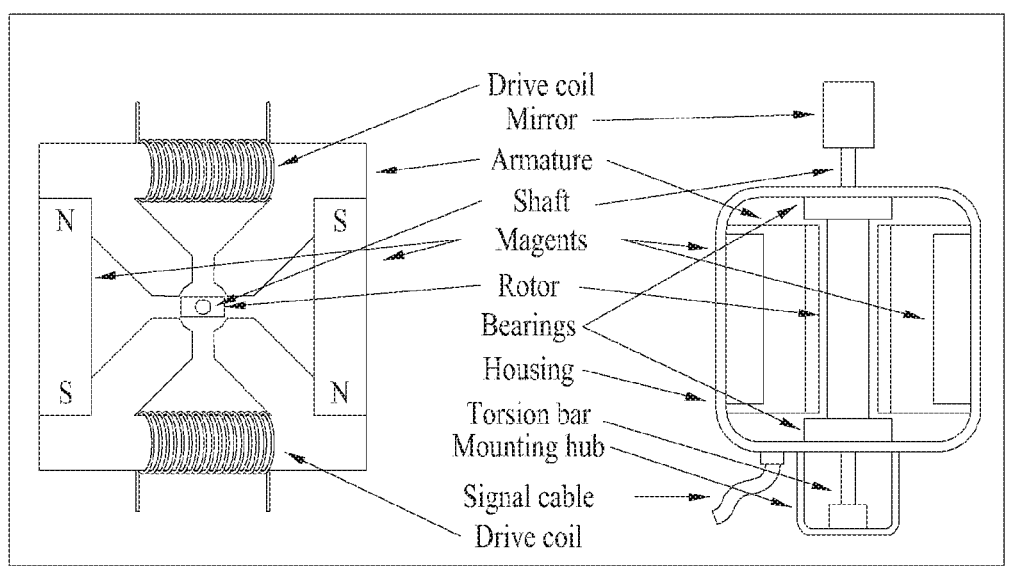
Figure 8:
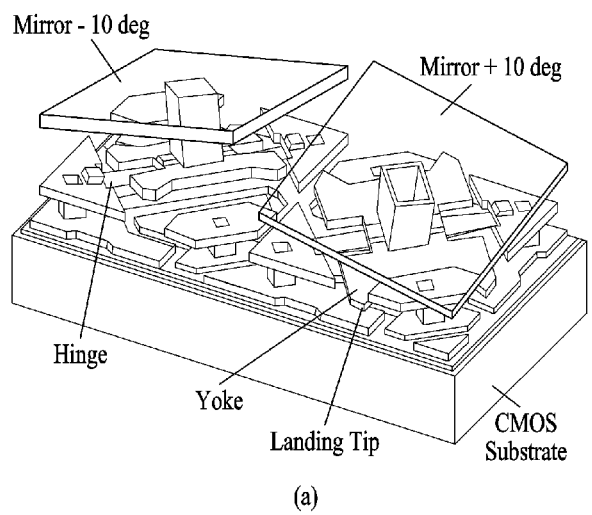
Figure 8:
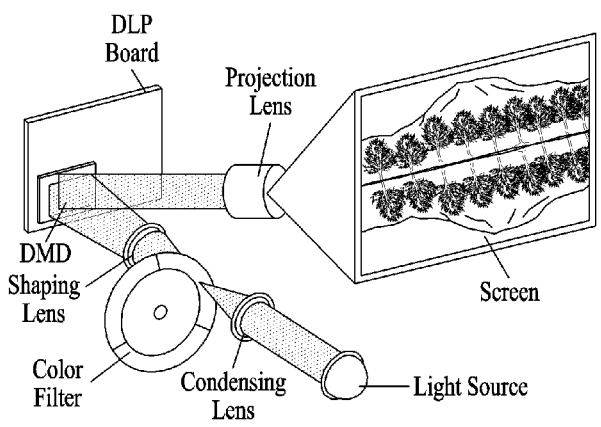
Figure 8:
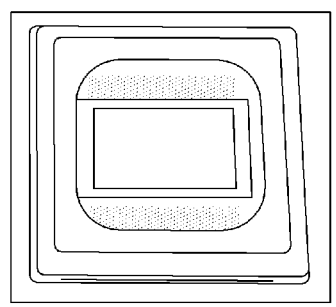

Meanwhile, according to the present disclosure, the light tracking unit 350 may perform the beam tracking using galvanometers as shown in FIG. 7 or Digital Micro-mirror Devices (DMDs) as shown in FIG. 8.

FIG. 7a illustrates a light tracking technique using normal galvanometers, and FIG. 7b illustrates the structure of a mirror module corresponding to each axis.

Referring to FIG. 7a, the beam tracking using the galvanometers of FIG. 7 corresponds to a technique of adjusting the direction of a beam using motorized mirrors on X-Y axes. Referring to FIG. 7b, when a current flows in an induction (drive) coil, a bar rotates. In addition, since a mirror is attached to the end of the bar, the bar rotates the mirror when it rotates. By doing so, a beam direction is adjusted. The mirror modules are implemented as X-Galvo and Y-Galvo, respectively, and using the mirror modules, light can be tracked on the X-Y plane.

FIG. 8a illustrates the structure of a DMD module, FIG. 8b illustrates a projection television using a DMD, and FIG. 8c illustrates a DMD mirror.

In DMD technology, a very small mirror (for example, several um to mm) is disposed on a microchip, and the microchip adjusts the direction of the mirror to control the direction of incident light. The DMD technology is widely used for normal projects.

Since the present disclosure uses well-known techniques including the description of FIGS. 7 and 8 for beam tracking as it is or after partially modifying the techniques, the details of the beam tracking are not described in this specification.

Figure 4:
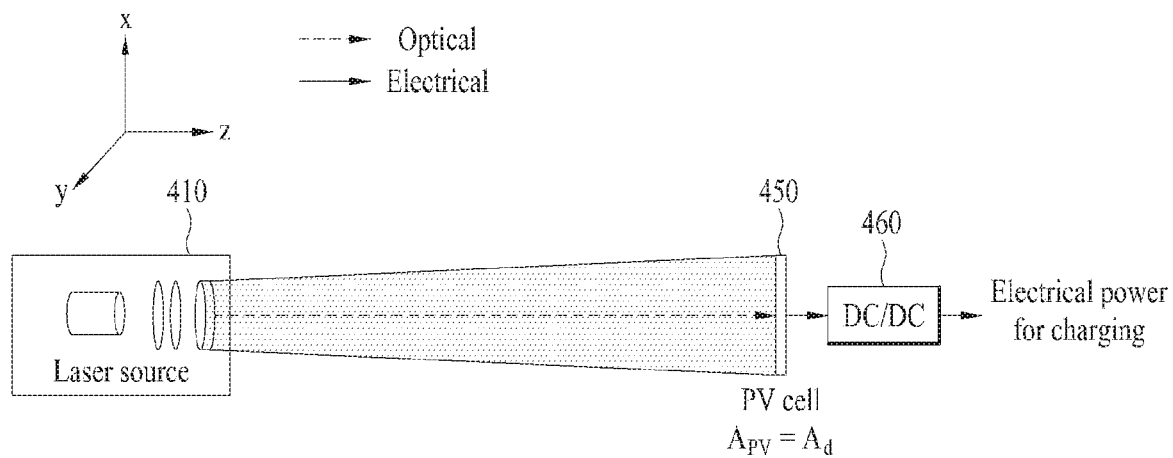
FIGS. 4 to 6 are diagrams illustrating beam tracking in a wireless power transmission process according to an embodiment of the present disclosure.
Figure 5:
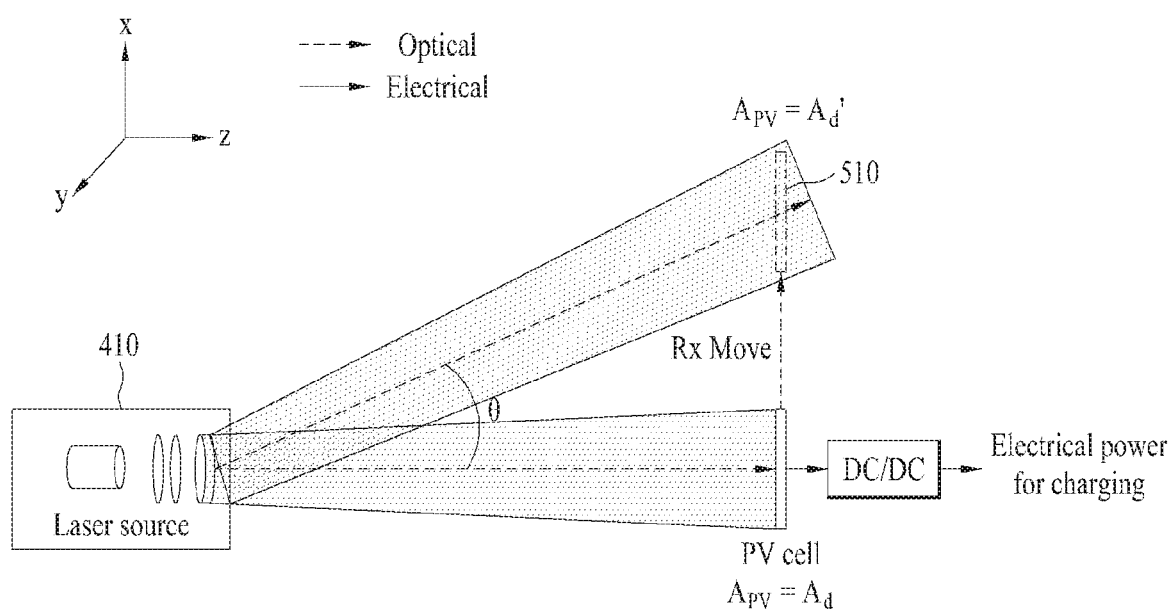
Figure 6:
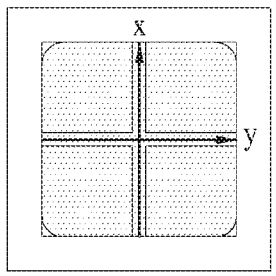
Figure 6:
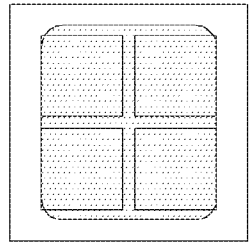
Figure 6:
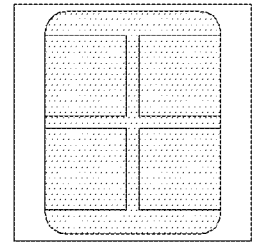

FIGS. 4 to 6 are diagrams illustrating beam tracking in a wireless power transmission process according to an embodiment of the present disclosure.

According to the present disclosure, performance degradation, which may occur due to a mismatch between a wireless power transmission apparatus (Tx) and a wireless power reception apparatus (Rx) with mobility when the wireless power transmission apparatus transmits power to the wireless power reception apparatus in a light (e.g., laser) wireless power transmission system, may be improved.

For example, even in a wireless power system including the beam tracking technique illustrated in FIG. 7 or 8, when a wireless power transmission apparatus (Tx) is matched or aligned with a wireless power reception apparatus (Rx) as shown in FIG. 4, that is, when the wireless power transmission apparatus (Tx) does not face the wireless power reception apparatus (Rx), if the wireless power reception apparatus (Rx) has a certain event, and more particularly, moves as shown in FIG. 5, the Angle of Arrival (AOA), θ at a light receiving unit of the wireless power reception apparatus (Rx) may be greater than 0° (i.e., θ>0°). In this case, the light receiving unit may correspond to the surface of a PV cell illustrated in FIG. 4 or 5. When the AOA (θ) is 0°, it means that the wireless power transmission apparatus (Tx) is perfectly aligned with the wireless power reception apparatus (Rx).

Referring to FIG. 4 or 5, a wireless power system may include a wireless power transmission apparatus (Tx) 410 and a wireless power reception apparatus (Rx).

The wireless power transmission apparatus (Tx) 410 may include the components described above in FIG. 3. Preferably, the wireless power transmission apparatus (Tx) 410 may include not only the configurations in FIG. 3 but also the configurations in FIG. 14 or 15.

The wireless power reception apparatus (Rx) may include a light receiving unit configured to receive light emitted from the wireless power transmission apparatus (Tx) 410, that is, a PV cell 460 and a converter 460 (e.g., DC/DC) to generate power for charging.

Hereinafter, beam tracking is described to explain the present disclosure with reference to FIGS. 4 and 5.

First, the terminology used in the present disclosure is defined as follows.

$A_{pv}$ indicates the light receiving area of a PV cell, and $A_d$ indicates the cross-sectional area of transmission light at a predetermined distance or position (d).

The AOA (θ) may mean the angle between the output point of a wireless power transmission apparatus (Tx), for example, the center 412 of a lens and the center 452 of the PV cell of a wireless power reception apparatus (Rx).

FIG. 4 shows a case where the AOA (θ) is 0°. That is, when the AOA (θ) is 0° as shown in FIG. 4, $A_{pv}$ is equal to $A_{d1}$. In other words, when the AOA (θ) is 0° as shown in FIG. 4, the cross-sectional area ($A_{d1}$) of the transmission light at the predetermined distance (d) is equal to the light receiving area ($A_{pv}$) of the light receiving unit as shown in FIG. 6a, or it is assumed to have the highest wireless power transmission efficiency.

In contrast to FIG. 4 where the AOA (θ) is 0°, when the PV cell of the wireless power reception apparatus (Rx) moves due to the occurrence of an event as shown in FIG. 5, the AOA (θ) is changed. In other words, the AOA (θ) is no longer 0°.

When the location of the PV cell in FIG. 4 is defined as a first location, the cross-sectional area of the transmission light is defined as $A_{d1}$. When the location of the PV cell in FIG. 5 is defined as a second location, the cross-sectional area of the transmission light is defined as $A_{d2}$.

When the PV cell is positioned at the first location as shown in FIG. 4, the PV cell is away by a distance (d1) from the wireless power transmission apparatus (Tx) and the light receiving area ($A_{pv}$) of the PV cell is equal to the cross-sectional area of received light. That is, since the wireless power transmission apparatus (Tx) is perfectly aligned with the wireless power reception apparatus (Rx), overfill loss becomes zero.

Meanwhile, when the PV cell moves in parallel to the x axis, the location of the PV cell may be changed from the first location to the second location as shown in FIG. 5. In this case, by performing the beam tracking, the wireless power transmission apparatus controls the transmission light to be emitted to the second position at which the PV cell is positioned.

Even when the transmission light ideally corresponds to parallel light with no diffraction as described above, the effective light receiving area of the PV cell may be smaller than $A_{d1}$ since it corresponds to $A_{pv}\cos\theta$.

In other words, when the PV cell is not perfectly aligned as shown in FIG. 5, the overfill loss may occur. The overfill loss increases, for example, as the AOA ($\theta$) increases. The increase in the overfill loss degrades the wireless power transmission efficiency.

FIG. 6a illustrates a case where there is no overfill loss since the wireless power transmission apparatus is perfectly aligned with the PV cell ($\theta=0°$), whereas FIG. 6b shows a case where the AOA ($\theta$) is $\theta 1$ or $\theta 2$ (that is, $\theta$ is not 0°). From FIG. 6b, it can be seen that since the transmission cross-sectional area ($A_d$) is not equal to the light receiving cross-sectional area ($A_{pv}$), the overfill loss occurs.

When the PV cell is positioned at the second location as shown in FIG. 5, the light receiving area becomes smaller than the cross-sectional area of the received light, compared to the perfect alignment, that is, when $\theta=0°$. As a result, the overfill loss occurs so that the power transmission efficiency is degraded.

To solve this problem, the present disclosure proposes a method of overcoming the overfill loss and maximizing the wireless power transmission efficiency.

In other words, the present disclosure relates to a method of solving the overfill loss problem and the transmission efficiency problem caused by a change in the effective light receiving area due to an event at the wireless power reception apparatus (Rx), for example, a change in the location of the light receiving unit.

The present disclosure proposes a method of shaping a beam of the wireless power transmission apparatus (Tx) to solve the overfill loss problem. For example, the beam shaping method includes adjusting the cross-sectional area size of the transmission light.

Meanwhile, according to the present disclosure, the beam shaping method for the transmission light, which is used to solve the overfill loss problem, may be made on the premise of data communication between the wireless power transmission apparatus (Tx) and the wireless power reception apparatus (Rx). In this case, BT, Wi-Fi, etc. may be used as communication protocols for the data communication.

Figure 9:
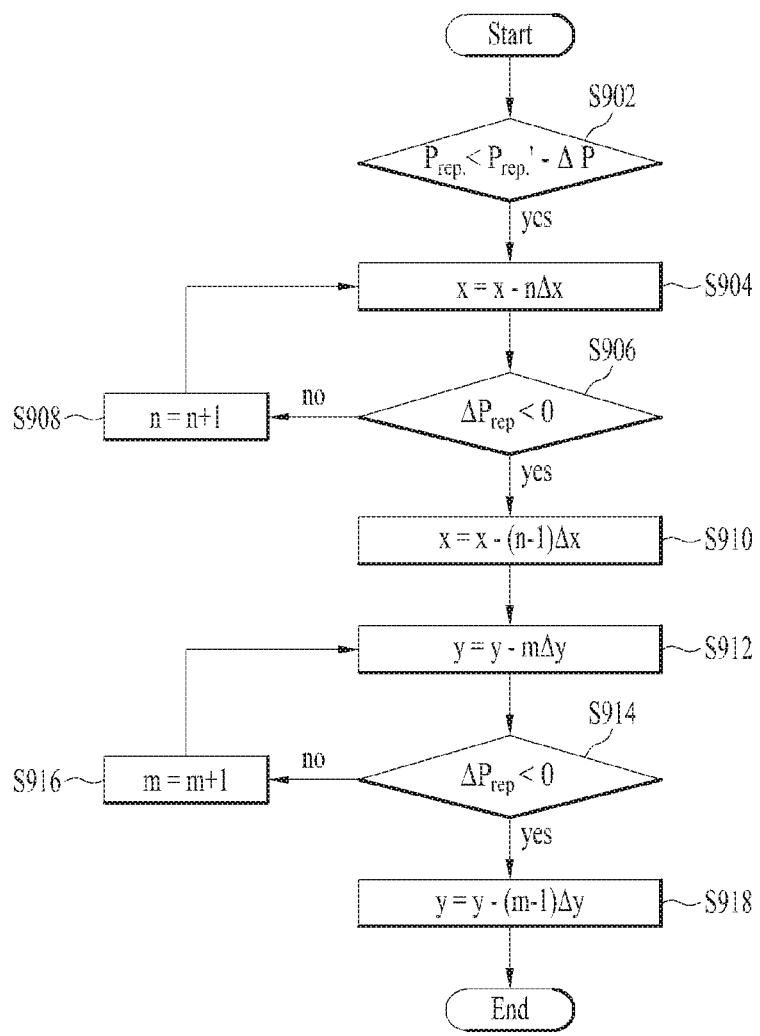
FIGS. 9 and 10 are diagrams illustrating an adaptive beam shaping method for a wireless power transmission apparatus according to an embodiment of the present disclosure.
Figure 10:
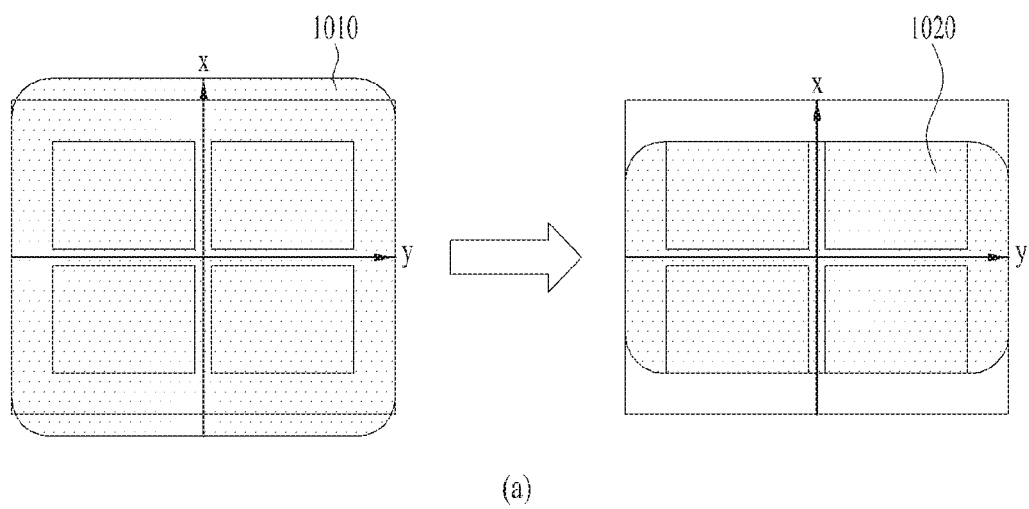
Figure 10:
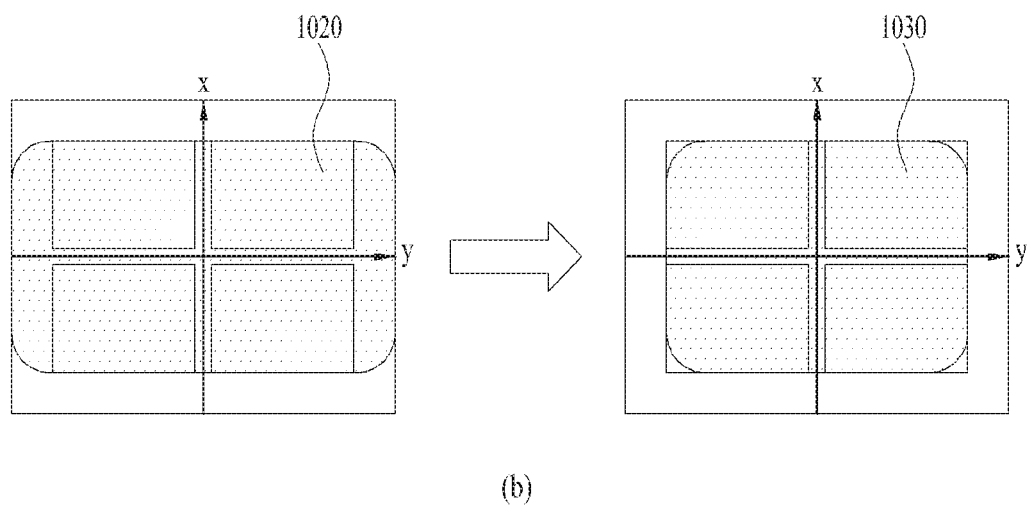

FIGS. 9 and 10 illustrate an adaptive beam shaping method for a wireless power transmission apparatus according to an embodiment of the present disclosure.

Hereinafter, the terminology used in FIGS. 9 to 15 is described in brief.

$P_{rep}$ indicates the value of $P_{out}$ that a wireless power reception apparatus (Rx) returns or report to a wireless power transmission apparatus (Tx).

$P_{rep'}$ indicates the initial value of $P_{rep}$ or the previous value of $P_{rep}$. In general, $P_{rep}$ may be greater than $P_{req}$ ($P_{rep}>P_{req}$).

$P_{req}$ indicates the minimum power value required to drive and/or charge the wireless power reception apparatus (Rx).

$\Delta P$ indicates the minimum variation of received power at which beam shaping is required.

$\Delta x$ and $\Delta y$ indicate beam shaping resolution in x-axis and y-axis directions, respectively.

$\Delta P_t$ indicates transmitted-light power variation resolution.

FIG. 9 is a flowchart illustrating an adaptive beam shaping method (or scheme) for transmission light according to an embodiment of the present disclosure, and FIG. 10 is a diagram illustrating changes made by the adaptive beam shaping method for the transmission light of FIG. 9.

Although FIG. 9 illustrates that beam shaping is first performed in the x-axis direction and then performed in the y-axis direction, the beam shaping may be performed in the opposite way.

Meanwhile, the operations in FIGS. 9 to 15 may be performed when the AOA ($\theta$) is changed as illustrated in FIG. 5 or when the AOA ($\theta$) is not 0°.

Figure 11:
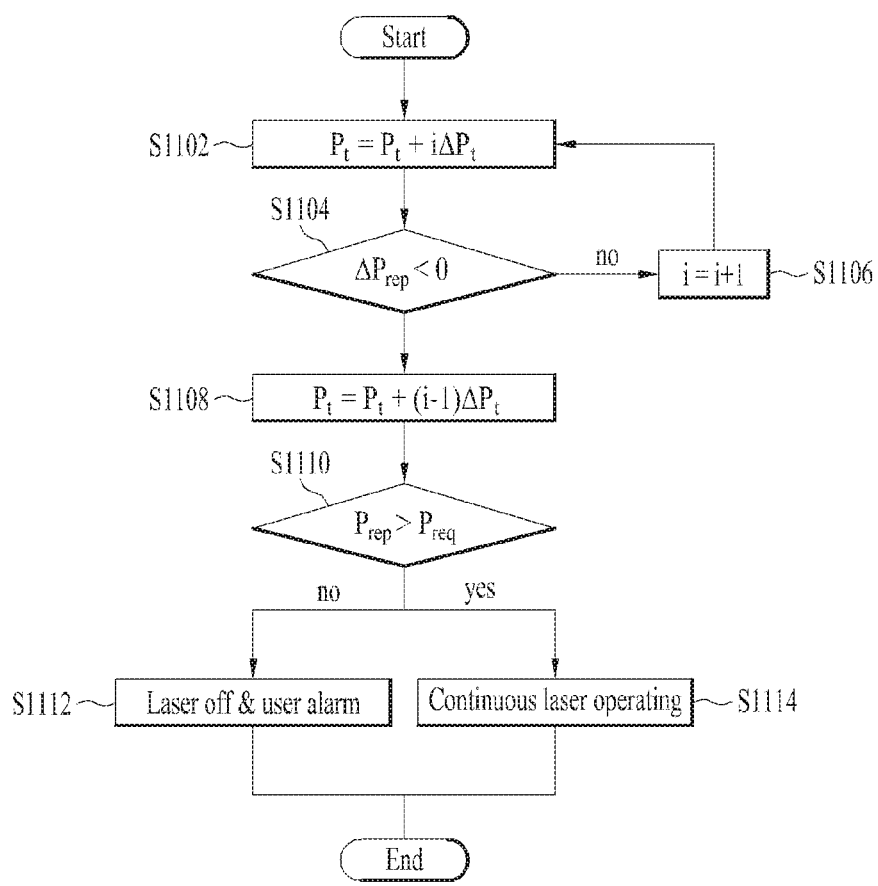
FIGS. 11 and 12 are diagrams illustrating an optimized power efficiency adjustment method for a wireless power transmission apparatus according to an embodiment of the present disclosure.
Figure 13:
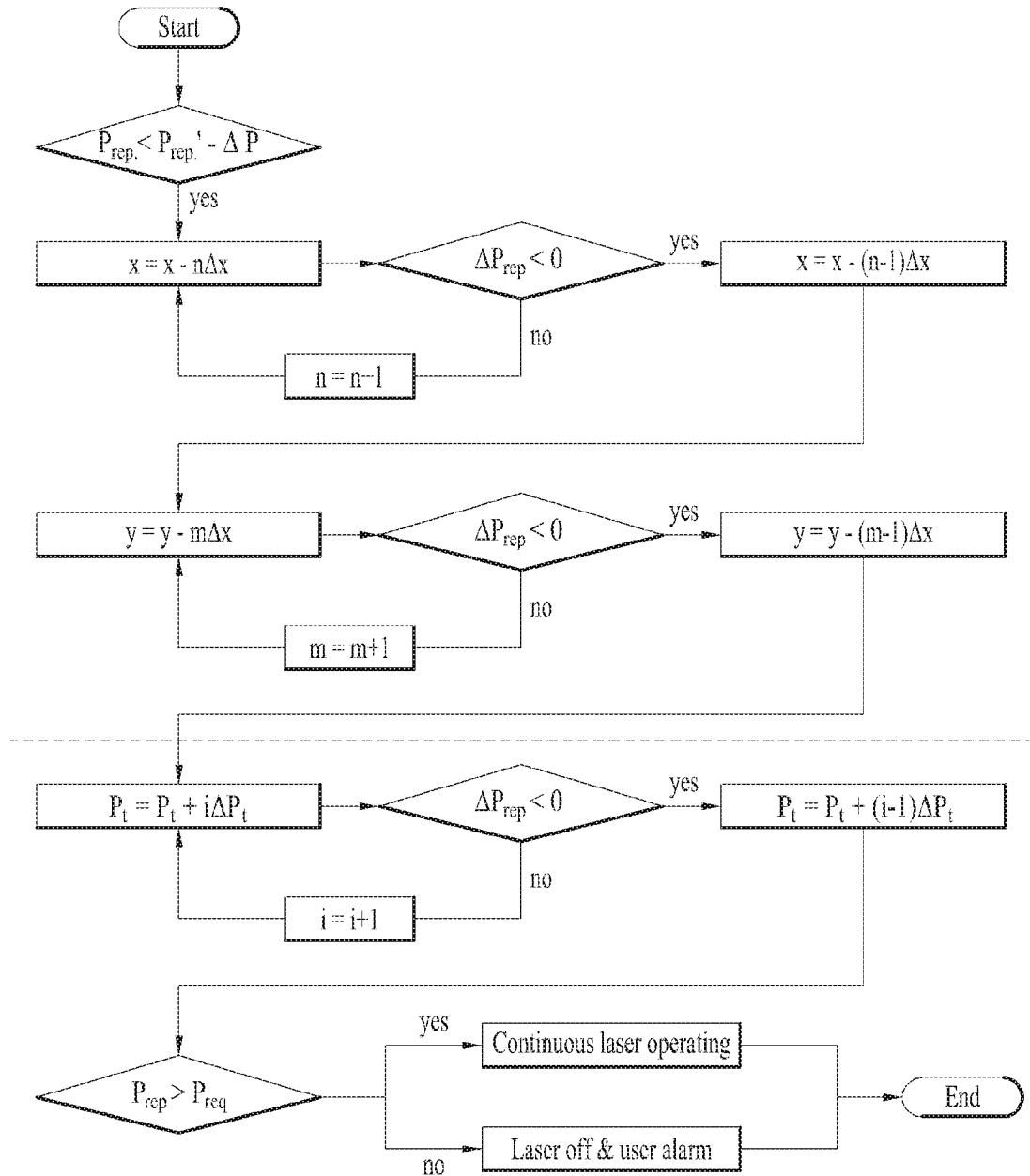
FIG. 13 is a flowchart illustrating an adaptive light transmission method for a wireless power transmission apparatus according to an embodiment of the present disclosure.

In addition, although data communication between a wireless power transmission apparatus (Tx) and a wireless power reception apparatus (Rx) is not illustrated in the flowcharts of FIGS. 9, 11, and 13, it may be premised.

Hereinafter, a beam shaping method for reducing or eliminating overfill loss will be described with reference to FIGS. 9 and 10.

First, a control unit of the wireless power transmission apparatus (Tx) extracts the value of $P_{rep}$ from data received from the wireless power transmission apparatus (Rx) through a communication module. The control unit determines whether the extracted value of $P_{rep}$ is less than a value obtained by subtracting $\Delta P$ from $P_{rep'}$ ($P_{rep}<P_{rep'}-\Delta P$) (S902).

Based on the result determined in step S902, when the value of $P_{rep}$ is less than the value obtained by subtracting $\Delta P$ from $P_{rep'}$, the control unit sets the x-axis value of the cross-sectional area of the transmission light to a value obtained by subtracting the value of $n\Delta x$ from the x-axis value for beam shaping of the transmission light (S904), where n may be a positive integer.

Based on the x-axis value set in step S904, the control unit determines whether the value of $\Delta P_{rep}$ is less than a predetermined threshold (0) (S906).

Based on the result determined in step S906, when the value of $\Delta P_{rep}$ is equal to or more than the predetermined threshold (0), the control unit increases the value of n, which is used in step S904 (S908). That is, n becomes n+1. Thus, the value of x set in step S904 is changed during step S908, and the determination process, i.e., step S906 is repeated.

Based on the result determined in step S906, when the value of $\Delta P_{rep}$ is less than the predetermined threshold (0), the control unit finally sets the value of x set in step S904 to $x-(n-1)\Delta x$ (S910).

The beam shaping of the cross-sectional area of the transmission light, particularly, in the x-axis direction is performed in steps S904 to S910. The beam shaping is illustrated in FIG. 10a. Here, the result determined in step S906 includes the result re-determined in step S906 after changing the value of x in step S908.

When the value of $\Delta P_{rep}$ is less than the predetermined threshold (0), it may mean that the beam shaping is performed too many times. That is, the use of the variable of n−1 in step S910 means the use of the previously set value of x to compensate for the excessive beam shaping.

Hereinafter, how the beam shaping is performed on the y-axis of the cross-sectional area of the transmission light will be described.

Since step S902 is already performed, the result thereof may be used. Alternatively, step S902 may be performed again for the beam shaping on the y-axis.

Based on the result determined in step S902, the control unit, when the value of $P_{rep}$ is less than the value obtained by subtracting $\Delta P$ from $P_{rep}$, the control unit sets the y-axis value of the cross-sectional area of the transmission light to a value obtained by subtracting the value of $m\Delta y$ from the y-axis value for the beam shaping of the transmission light (S912), where m may be a positive integer.

Based on the y-axis value set in step S912, the control unit determines whether the value of $\Delta P_{rep}$ is less than a predetermined threshold (0) (S914).

Based on the result determined in step S914, when the value of $\Delta$Prep is equal to or more than the predetermined threshold (0), the control unit increases the value of m, which is used in step S912 (S916). That is, m becomes m+1. Thus, the value of y set in step S912 is changed during step S916, and the determination process, i.e., step S914 is repeated.

Based on the result determined in step S914, when the value of $\Delta P_{rep}$ is less than the predetermined threshold (0), the control unit finally sets the value of y set in step S912 to $y-(m-1)\Delta y$ (S918).

The beam shaping of the cross-sectional area of the transmission light, particularly, in the y-axis direction is performed in steps S912 to S918. The beam shaping is illustrated in FIG. 10b. Here, the result determined in step S914 includes the result re-determined in step S914 after changing the value of y in step S916.

When the value of $\Delta P_{rep}$ is less than the predetermined threshold (0), it may mean that the beam shaping is performed too many times. That is, the use of the variable of m−1 in step S918 means the use of the previously set value of y to compensate for the excessive beam shaping.

By applying the adaptive beam shaping method to the cross-sectional area of the transmission light as described above, the cross-section are ($A_d$) of the transmission light may be adjusted such that it fits with the area ($A_{pv}$) of the reception light as shown in FIG. 6a.

According to the present disclosure, the cross-sectional area of transmission light may be changed by beam shaping such that it perfectly matches with that of reception light as shown in FIG. 6a. However, by configuring an appropriate level for each system, a mismatch therebetween may be allowed when the mismatch is less than a predetermined threshold. That is, the beam shaping process may be performed according to such a configuration as shown in FIG. 9.

Figure 12:
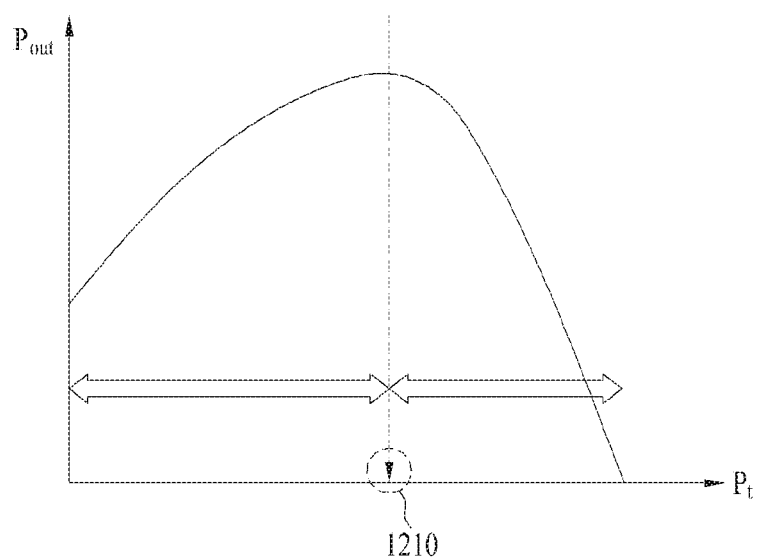

FIGS. 11 and 12 are diagrams illustrating an optimized power efficiency adjustment method for a wireless power transmission apparatus according to an embodiment of the present disclosure.

According to the present disclosure, a wireless power transmission apparatus may perform adjustment to obtain optimized transmission light power together with or separated from the operations illustrated in FIG. 9. The adjustment depends on heat radiation performance of a light receiving unit, and it may be performed even when the AOA (θ) is 0° as shown in FIG. 4.

FIG. 12 is a graph showing optimized transmission power depending on heat radiation performance of a light receiving unit of a wireless power reception apparatus (Rx).

In this graph, the y-axis is $P_{out}$ and the x-axis is $P_t$.

When the light receiving unit is placed at the first location as shown in FIG. 4, the Optical-to-Electrical (O/E) conversion efficiency of the light receiving unit increases as the power density of transmission light increases. However, when the light receiving unit moves to the second location, the O/E conversion efficiency is degraded due to an increase in the temperature of the light receiving unit.

As shown in FIG. 12, $P_{out}$ does not infinitely increase as time passes, but $P_{out}$ decreases after a certain time point 1210 ($P_{t1}$) depending on the heat radiation performance of the light receiving unit. In other words, $P_{out}$ does not linearly increase as the power density of the transmission light increases, but $P_{out}$ decreases after the certain time point 1210 ($P_{t1}$) even if the power density of the transmission light increases.

Thus, if the wireless power reception apparatus (Rx) returns information on the time point 1210 ($P_{t1}$) where $P_{out}$ is maximized as the power density of the transmission light increases, a wireless power transmission apparatus (Tx) may use the power density at the corresponding time point to transmit the optimized transmission light power, thereby increasing the transmission efficiency.

The operation will be described in further detail with reference to FIG. 11.

A control unit sets $P_t$ by adding $i\Delta P_t$ to $P_t$ (S1102). In this case, the control unit determines whether the value of $\Delta P_{rep}$ is less than a predetermined threshold (0) (S1104).

Based on the result determined in step S1104, when the value of $\Delta P_{rep}$ is equal to or more than a predetermined threshold, the control unit resets the value of i by adding 1 to i (S1106). In other words, the value of $P_t$ set in step S1102 increases, and step S1104 is repeated.

Based on the results determined in step S1104, when the value of $\Delta P_{rep}$ is less than the predetermined threshold, the control unit sets $P_t$ to $P_t+(i-1) \Delta P_t$ (S1108).

Thereafter, the control unit determines whether the value of $P_{rep}$ is equal to or more than the value of $P_{req}$ (S1110).

Based on the result determined in step S1110, when the value of $P_{rep}$ is less than the value of $P_{req}$, the control unit terminates light radiation and then notify a user that the light radiation is terminated (S1112).

Meanwhile, based on the result determined in step S1110, when the value of $P_{rep}$ is equal to or more than the value of $P_{req}$, the control unit continues the light radiation (S1114).

FIG. 13 is a flowchart illustrating an adaptive light transmission method for a wireless power transmission apparatus according to an embodiment of the present disclosure.

FIG. 13 relates to a combination of FIGS. 9 and 11. However, FIG. 13 is different from FIGS. 9 and 11 in that FIG. 13 shows how to obtain optimized power transmission efficiency after beam shaping, whereas FIG. 9 shows only how to perform the beam shaping method and FIG. 11 shows only how to obtain the optimized power transmission efficiency.

Referring to FIG. 13, a wireless power transmission apparatus (Tx) may perform adaptive light transmission.

The operation illustrated in FIG. 9, 11, or 13 may be performed periodically, aperiodically, or according to a user request.

Figure 14:
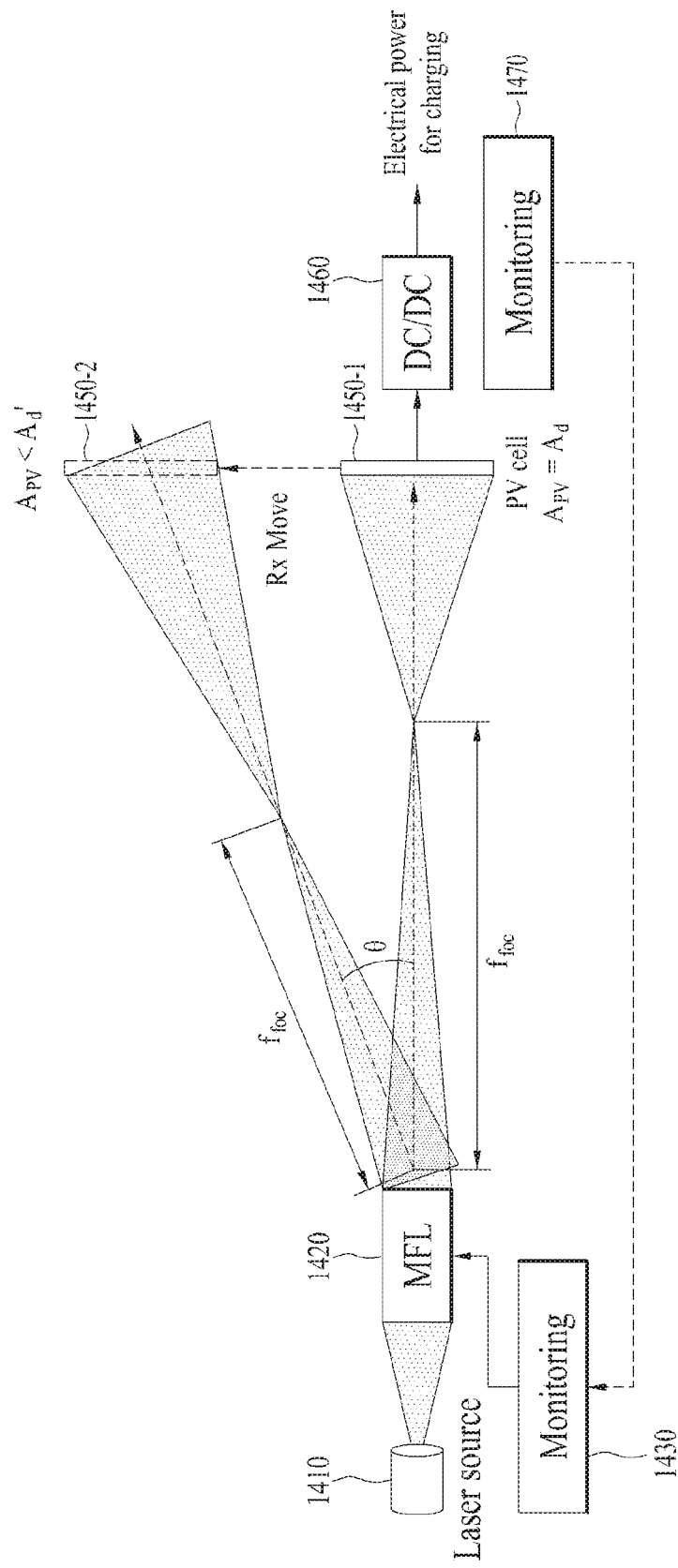
FIGS. 14 and 15 are diagrams illustrating the configuration of an optical system for adaptive light transmission of a wireless power transmission apparatus according to an embodiment of the present disclosure.
Figure 15:
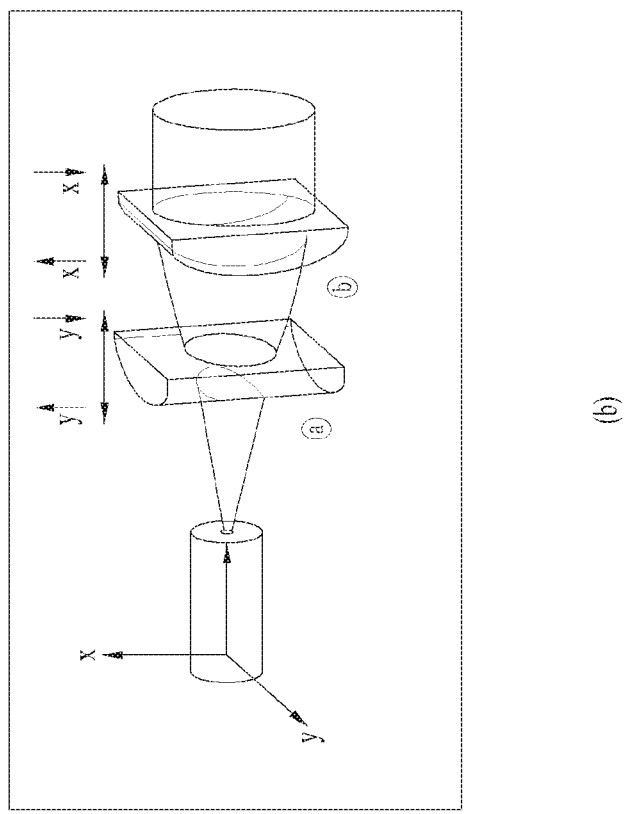
Figure 15:
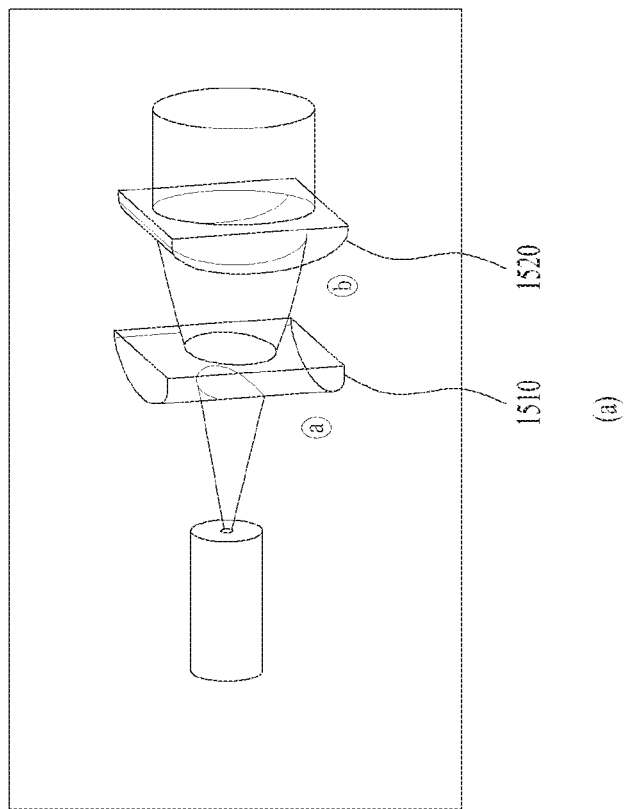

FIGS. 14 and 15 are diagrams illustrating the configuration of an optical system for adaptive light transmission of a wireless power transmission apparatus according to an embodiment of the present disclosure.

Specifically, FIG. 14 illustrates the configuration of an optical system of a wireless power system for performing at least one of the operations illustrated in FIGS. 9, 11, and 13, and FIG. 15 illustrates the detailed configuration of a Motorized Focal Lens (MFL) in FIG. 14.

Light control according to the present disclosure such as beam shaping may be performed as illustrated in FIGS. 14 and 15.

FIG. 14 illustrates the configuration of an optical system of a wireless power transmission apparatus (Tx) configured to perform adaptive beam shaping for transmission light according to the present disclosure.

In FIG. 14, an MFL module 1420 may perform beam shaping for light emitted from a laser light source unit 1410.

In this case, as shown in FIG. 15a, the MFL module 1420 includes two lenses and adjusts the size of the cross-sectional area of transmission light for the beam shaping.

Although each MFL lens is illustrated as a cylindrical lens, the present disclosure is not limited thereto. In addition, the number of MFL lenses is not limited to 2, that is, one or more MFL lenses may be used depending on cases. Moreover, all MFL lenses may not be necessarily the same cylindrical lens. In other words, one MFL lens may be a cylindrical lens, and the other MFL lens may not be a cylindrical lens.

In FIG. 15a, two MFL lenses, i.e., a first MFL lens 1510 and a second MFL lens 1520 are illustrated as cylindrical lenses for convenience of description.

Referring to FIG. 15b, the first MFL lens 1510 shapes the y-axis direction beam of the transmission light, and the second MFL lens 1520 shapes the x-axis direction beam of the transmission light. However, the present disclosure is not limited thereto, that is, the opposite case is also possible.

The use of the cylindrical lenses in FIGS. 14 and 15 is to adjust the size to fit with a light receiving area by changing a focal length.

In FIG. 14, the light receiving area may decrease when a light receiving unit moves (from 1450-1 to 1450-2). Thus, when the AOA (θ) is 0°, i.e., in the case of perfect alignment, the focal length ($f_{oc}$) is adjusted to increase (from $f_{oc}$ to $f_{oc'}$) such that overfill loss becomes zero.

According to the wireless power transmission apparatus and method thereof described with reference to various embodiments of the present disclosure, wireless power transmission efficiency can be improved based on an effective light receiving area of a wireless power receiving side. In addition, even if there is a change in the effective light receiving area, it is possible to prevent the wireless power transmission efficiency from being degraded by adaptively changing a transmission mechanism based on the change. Further, even when there are various events during a wireless power transmission process, it is possible to prevent the efficiency of a wireless power system from being degraded or improve the wireless power system efficiency.

Those skilled in the art will appreciate that the present disclosure may be carried out in other specific ways than those set forth herein without departing from the essential characteristics of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

MODE FOR INVENTION

Since various embodiments for carrying out the invention have been described in BEST MODE FOR INVENTION, it is apparent that other embodiments and variations of this invention may be devised by others skilled in the art without departing from the true spirit and scope of the invention.

INDUSTRIAL APPLICABILITY

Since the wireless power technology according to the present disclosure can be applied to various devices, the industrial applicability thereof is acknowledged.

The invention claimed is:

1. A wireless power transmission apparatus, comprising:
a laser light source unit;
a light output unit configured to emit laser light generated by the laser light source unit to a light receiving unit of a wireless power reception apparatus; and
a control unit configured to:
control shaping of the emitted light based on an angle of arrival at the light receiving unit such that overfill loss becomes smaller than a predetermined threshold,
extract a value of $P_{rep}$ from data received from the wireless power reception apparatus;
determine whether the extracted value of $P_{rep}$ is smaller than a value obtained by subtracting $\Delta P$ from $P_{rep'}$ ($P_{rep} < P_{rep'} - \Delta P$); and
control the shaping for at least one axis of a cross-sectional area of the emitted light based on the determination result,
wherein $P_{rep}$ indicates a value of received power ($P_{out}$) reported by the wireless power reception apparatus to the wireless power transmission apparatus, $P_{rep'}$ indicates an initial value of $P_{rep}$, and $\Delta P$ indicates a minimum variation of the received power at which the shaping is required.

2. The wireless power transmission apparatus of claim 1, wherein the control unit is configured to:
detect a point at which power conversion efficiency of the light receiving unit is maximized; and
configure and control a power density value of the emitted light at the detected point.

3. The wireless power transmission apparatus of claim 1, wherein when a value of $\Delta P_{rep}$ is smaller than a predetermined threshold, the control unit is configured to terminate the shaping for the at least one axis of the cross-sectional area of the emitted light, and wherein $\Delta P_{rep}$ indicates a minimum variation of $P_{rep}$ at which the shaping is required.

4. The wireless power transmission apparatus of claim 3, wherein the control unit is configured to:
determine whether the value of $\Delta P_{rep}$ is smaller than a predetermined threshold by adding $i\Delta P_t$ to $P_t$; and
determine power density for optimized power of the emitted light based on the determination result, and
wherein $\Delta P_t$ indicates power variation resolution of the emitted light and $\Delta P_{rep}$ indicates a minimum variation of $P_{rep}$ at which the shaping is required.

5. The wireless power transmission apparatus of claim 4, wherein the control unit is configured to:
determine whether a value of $P_{rep}$ is equal to or greater than a value of $P_{req}$; and
control whether to perform light radiation based on the determination result, and
wherein $P_{req}$ indicates minimum required power of the wireless power reception apparatus.

6. The wireless power transmission apparatus of claim 1, further comprising a Motorized Focal Lens (MFL) module including a first lens and a second lens, each of which shapes each axis of a cross-sectional area of the emitted light.

7. The wireless power transmission apparatus of claim 6, wherein at least one of the first and second lenses is implemented as a cylindrical lens.

8. The wireless power transmission apparatus of claim 7, wherein the MFL module is configured to modify the cross-sectional area of the emitted light by adjusting a focal length of the emitted light based on a change in the angle of arrival.

9. The wireless power transmission apparatus of claim 2, further comprising a communication module configured to receive data related to a light receiving area of the light receiving unit from the wireless power reception apparatus.

* * * * *